(12) United States Patent
Rock (10) Patent No.: US 6,503,653 B2
(45) Date of Patent: Jan. 7, 2003

(54) STAMPED BIPOLAR PLATE FOR PEM FUEL CELL STACK

(75) Inventor: Jeffrey A. Rock, Penfield, NY (US)

(73) Assignee: General Motors Corporation, Detroit, MI (US)

(*) Notice: Subject to any disclaimer, the term of this patent is extended or adjusted under 35 U.S.C. 154(b) by 48 days.

(21) Appl. No.: 09/791,528

(22) Filed: Feb. 23, 2001

(65) Prior Publication Data

US 2002/0119358 A1 Aug. 29, 2002

(51) Int. Cl.[7] .......................... H01M 8/02; H01M 8/04; H01M 8/10
(52) U.S. Cl. ............................. 429/35; 429/38; 429/39
(58) Field of Search ............................ 429/30, 32, 34, 429/35, 38, 39

(56) References Cited

U.S. PATENT DOCUMENTS

| | | |
|---|---|---|
| 4,344,832 A | 8/1982 | Dahlberg |
| 4,769,297 A | 9/1988 | Reiser et al. |
| 5,108,849 A | 4/1992 | Watkins et al. |
| 5,230,966 A | 7/1993 | Voss et al. |
| 5,252,410 A | 10/1993 | Wilkinson et al. |
| 5,264,299 A | 11/1993 | Krasij et al. |
| 5,300,370 A | 4/1994 | Washington et al. |
| 5,482,680 A | 1/1996 | Wilkinson et al. |
| 5,521,018 A | 5/1996 | Wilkinson et al. |
| 5,547,776 A | 8/1996 | Fletcher et al. |
| 5,641,586 A | 6/1997 | Wilson |
| 5,773,160 A | 6/1998 | Wilkinson et al. |
| 5,776,624 A | 7/1998 | Neutzler |
| 5,804,326 A | 9/1998 | Chow et al. |
| 5,846,668 A | * 12/1998 | Watanabe ................ 204/258 |
| 5,874,182 A | 2/1999 | Wilkinson et al. |
| 5,928,807 A | 7/1999 | Elias |
| 5,945,232 A | 8/1999 | Ernst et al. |
| 5,981,098 A | 11/1999 | Vitale |
| 6,054,228 A | 4/2000 | Cisar et al. |
| 6,099,984 A | 8/2000 | Rock |
| 6,159,629 A | 12/2000 | Gibb et al. |
| 6,174,616 B1 | 1/2001 | Marvin et al. |
| 6,309,773 B1 | 10/2001 | Rock |
| 6,358,642 B1 | 3/2002 | Griffith et al. |

OTHER PUBLICATIONS

PCT Publication No. WO/0017952, published Mar. 30, 2000.
PCT Publication No. WO/94/09519, published Apr. 28, 1994.

* cited by examiner

Primary Examiner—Patrick Ryan
Assistant Examiner—Jonathan Crepean
(74) Attorney, Agent, or Firm—Karl F. Barr, Jr.; Cary W. Brooks; Linda M. Deschere (57) ABSTRACT

A bipolar plate assembly for a PEM fuel cell having a serpentine flow field formed on one side and an interdigitated flow field formed on the opposite side such that a single plate member is usable as an anode current collector and a cathode current collector of adjacent fuel cells. The bipolar plate assembly further includes a staggered seal arrangement to direct gaseous reactant flow through the fuel cell such that the seal thickness is maximized while the repeat distance between adjacent fuel cells is minimized.

20 Claims, 9 Drawing Sheets

STAMPED BIPOLAR PLATE FOR PEM FUEL CELL STACK

TECHNICAL FIELD

This invention relates to PEM fuel cells and more particularly to bipolar plates for separating adjacent fuel cells in a fuel cell stack.

BACKGROUND OF THE INVENTION

Fuel cells have been proposed as a power source for many applications. One such fuel cell is the proton exchange membrane or PEM fuel cell. PEM fuel cells are well known in the art and include in each cell thereof a so-called "membrane-electrode-assembly" or MEA comprising a thin, proton-conductive, polymeric, membrane-electrolyte having an anode electrode film formed on one face thereof, and a cathode electrode film formed on the opposite face thereof. Such membrane-electrolytes are well known in the art and are described in such as U.S. Pat. Nos. 5,272,017 and 3,134,697, as well as in the Journal of Power Sources, Volume 29 (1990) pages 367–387, inter alia.

In general, such membrane-electrolytes are made from ion-exchange resins, and typically comprise a perfluoronated sulfonic acid polymer such as NAFION™ available from the E.I. DuPont de Nemeours & Co. The anode and cathode films, on the other hand, typically comprise (1) finely divided carbon particles, very finely divided catalytic particles supported on the internal and external surfaces of the carbon particles, and proton conductive material such as NAFION™ intermingled with the catalytic and carbon particles, or (2) catalytic particles, sans carbon, dispersed throughout a polytetrafluoroethylene (PTFE) binder. One such MEA and fuel cell is described in U.S. Pat. No. 5,272,017 issued Dec. 21, 1993, and assigned to the assignee of the present invention.

The MEA is sandwiched between sheets of porous, gas-permeable, conductive material which press against the anode and cathode faces of the MEA and serve as (1) the primary current collectors for the anode and cathode, and (2) mechanical support for the MEA. Suitable such primary current collector sheets comprise carbon or graphite paper or cloth, fine mesh noble metal screen, and the like, as is well known in the art. This assembly is referred to as the MEA/primary current collector assembly herein.

The MEA/primary current collector assembly is pressed between a pair of non-porous, electrically conductive plates or metal sheets which serve as secondary current collectors for collecting the current from the primary current collectors and conducting current between adjacent cells internally of the stack (i.e., in the case of bipolar plates) and at the ends of a cell externally of the stack (i.e., in the case of monopolar plates). The secondary current collecting plate contains a flow field that distributes the gaseous reactants (e.g., $H_2$ and $O_2$/air) over the surfaces of the anode and cathode. These flow fields generally include a plurality of lands which engage the primary current collector and define therebetween a plurality of flow channels through which the gaseous reactants flow between a supply header at one end of the channel and an exhaust header at the other end of the channel.

Conventionally, these metal plates have a single functional flow field defining a particular geometry of the flow channel. One generally known flow field defines serpentine flow channels which connect the supply and exhaust header after making a number of hairpin turns and switch backs. Serpentine flow channels thus define a contiguous, albeit tortuous flow path. Another generally known flow field defines interdigitated flow channels in which a plurality of flow channels extending from the supply header towards the exhaust header but terminating at deadends are interdigitated between a plurality of flow channels extending from the exhaust header towards the supply header but terminating at deadends. In contrast to serpentine flow channels, these interdigitated flow channels define a noncontiguous path such that flow between the supply and exhaust header is achieved when the gaseous reactants traverses a land between adjacent flow channels through the porous primary current collector.

Conventionally, a bipolar plate is formed by assembling a pair of metal sheets such that a functional flow field is formed on each side of the bipolar plate assembly. Often times a spacer is interdisposed between the metal sheets to define an interior volume to permit coolant flow through the bipolar plate assembly. One such bipolar plate assembly is described in U.S. Pat. No. 5,776,624 issued Jul. 7, 1998, and assigned to the assignee of the present invention.

SUMMARY OF THE INVENTION

The present invention is directed to a stamped bipolar plate having a single metal sheet which defines functional flow fields on opposite sides thereof. The metal sheet incorporates a porting scheme which when combined with a staggered seal configuration directs the flow of gaseous fuel to one side of the plate and the flow of gaseous oxidant to the other side of the plate.

The present invention includes a bipolar plate formed from a single metal sheet having a serpentine flow field on one side of the plate and an interdigitated flow field on the opposite side of the plate. The formed metal sheet maintains a generally uniform wall thickness to produce an uncooled bipolar plate from a single sheet. A pair of bipolar plates may be layered together with a spacer there between to produce a bipolar plate with internal cooling channels.

The flow field geometry of the present invention is such that a pressure differential occurs across most areas where the plate touches the porous primary current collectors resulting in a higher performance than conventional bipolar plate assemblies.

The present invention further incorporates a staggered seal configuration which in conjunction with a specific port geometry communicates gaseous reactants to each cell without requiring additional parts or components to carry the seal load.

BRIEF DESCRIPTION OF THE DRAWINGS

The invention will be better understood when considered in the light of the following detailed description of a specific embodiment thereof which is given hereafter in conjunction with the several figures in which.

DESCRIPTION OF THE PREFERRED EMBODIMENT

Figure 1:
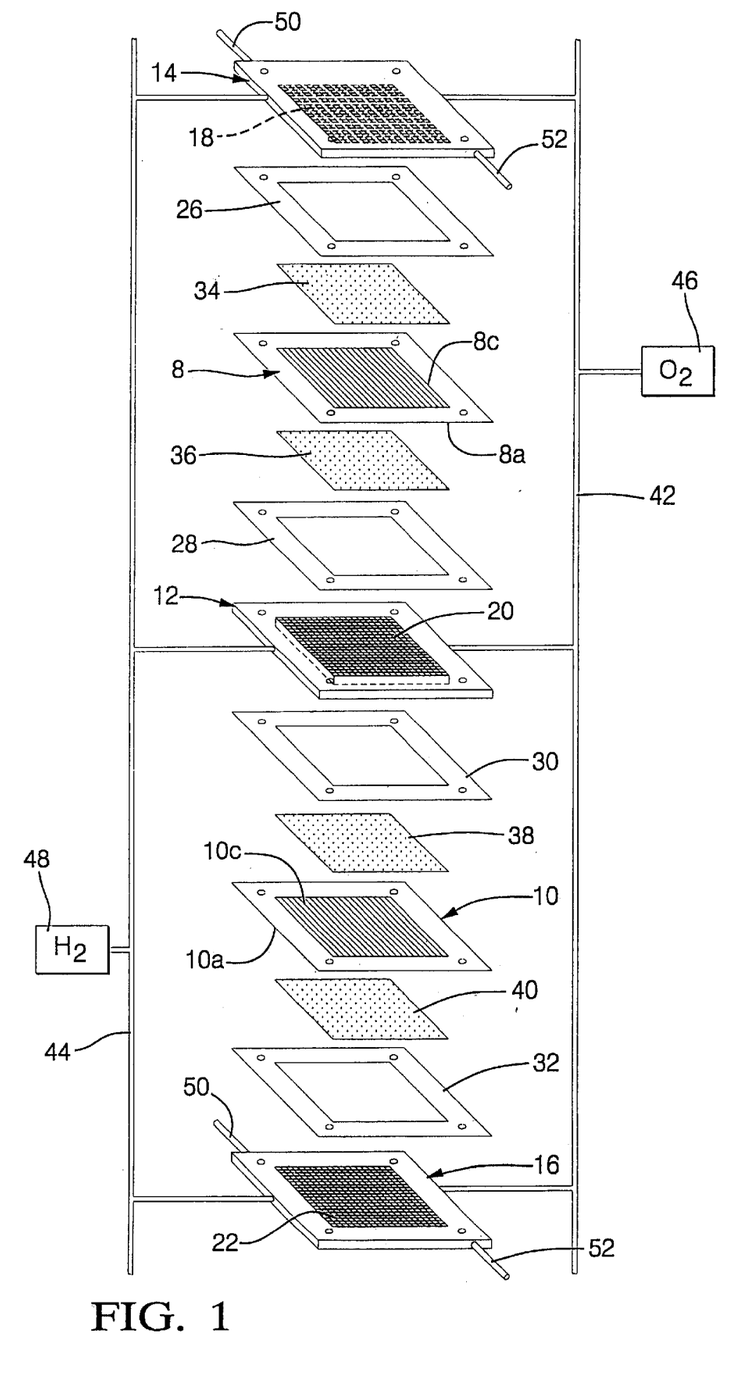
FIG. 1 is a schematic isometric exploded illustration of a PEM fuel stack.

FIG. 1 schematically depicts a partial PEM fuel cell stack having a pair of membrane-electrode-assemblies (MEAs) 8 and 10 separated from each other by a non-porous, electrically-conductive bipolar plate 12. Each of the MEAs 8, 10 have a cathode face 8c, 10c and an anode face 8a, 10a. The MEAs 8 and 10, and bipolar plate 12, are stacked together between non-porous, electrically-conductive, liquid-cooled bipolar plates 14 and 16. The bipolar plates 12, 14 and 16 each include flow fields 18, 20 and 22 having a plurality of flow channels formed in the faces of the plates for distributing fuel and oxidant gases (i.e., $H_2$ & $O_2$) to the reactive faces of the MEAs 8 and 10. Nonconductive gaskets or seals 26, 28, 30, and 32 provide a seal and electrical insulation between the several plates of the fuel cell stack. Porous, gas permeable, electrically conductive sheets 34, 36, 38 and 40 press up against the electrode faces of the MEAs 8 and 10 and serve as primary current collectors for the electrodes. Primary current collectors 34, 36, 38 and 40 also provide mechanical supports for the MEAs 8 and 10, especially at locations where the MEAs are otherwise unsupported in the flow field. Suitable primary current collectors include carbon/graphite paper/cloth, fine mesh noble metal screens, open cell noble metal foams, and the like which conduct current from the electrodes while allowing gas to pass therethrough.

Bipolar plates 14 and 16 press up against the primary current collector 34 on the cathode face 8c of MEA 8 and primary current collector 40 on the anode face 10a of MEA 10, while the bipolar plate 12 presses up against the primary current collector 36 on the anode face 8a of MEA 8 and against the primary current collector 38 on the cathode face 10c of MEA 10. An oxidant gas such as oxygen or air is supplied to the cathode side of the fuel cell stack from a storage tank 46 via appropriate supply plumbing 42. Similarly, a fuel such as hydrogen is supplied to the anode side of the fuel cell from a storage tank 48 via appropriate supply plumbing 44. In a preferred embodiment, the oxygen tank 46 may be eliminated, and air supplied to the cathode side from the ambient. Likewise, the hydrogen tank 48 may be eliminated and hydrogen supplied to the anode side from a reformer which catalytically generates hydrogen from methanol or a liquid hydrocarbon (e.g., gasoline). Exhaust plumbing (not shown) for both the $H_2$ and $O_2$/air sides of the MEAs is also provided for removing $H_2$-depleted anode gas from the anode flow field and $O_2$-depleted cathode gas from the cathode flow field. Coolant plumbing 50 and 52 is provided for supplying and exhausting liquid coolant to the bipolar plates 14 and 16, as needed.

Figure 2:
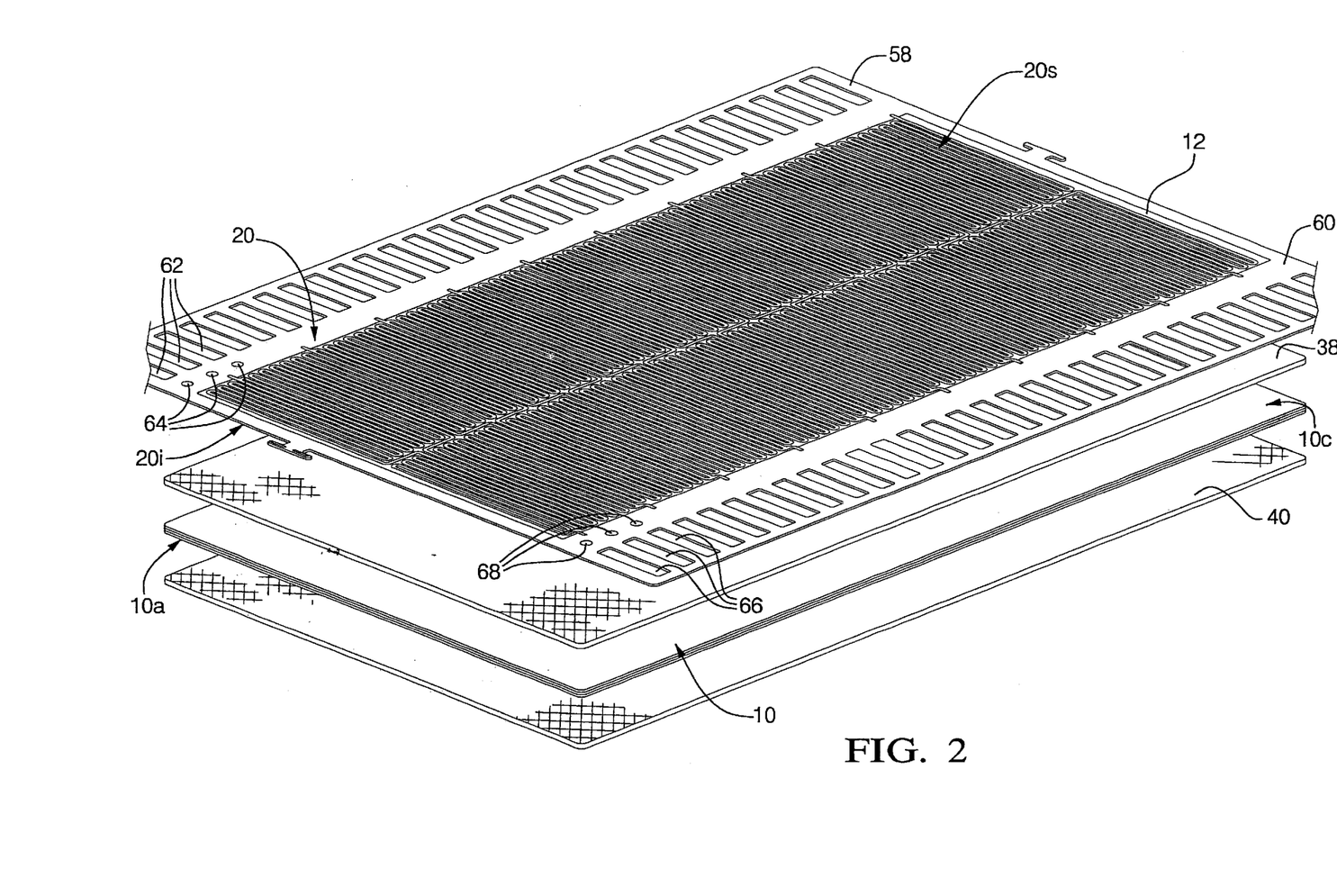
FIG. 2 is an isometric exploded view of an MEA and bipolar plate in a fuel cell stack.

FIG. 2 depicts an exploded view of the bipolar plate 12, primary current collector 38, MEA 10 and primary current collector 40 arranged in a stacked relationship in a fuel cell. Bipolar plate 16 would underlie the second primary collector 40 (as shown in FIG. 1) to form a fuel cell. Another set of primary current collectors 34 and 36, MEA 8 and bipolar plate 14 would overlie bipolar plate 12 (as shown in FIG. 1) to form another fuel cell.

The bipolar plate 12 is a single plate member having flow field 20 formed therein and made as thin as possible (e.g., about 0.002–0.02 inches thick). As presently preferred, the bipolar plates 12,14 and 16 are metal sheets preferably stainless steel that may be formed by stamping, by photo-etching (i.e., through a photolithographic mask) or any other conventional process for shaping sheet metal. One skilled in the art will recognize that other suitable materials and manufacturing processes may be utilized from the bipolar plates.

With reference to FIGS. 2–7, the bipolar plate 12 is formed such that the geometric configuration of the flow field 20 forms a functional serpentine flow field 20s on a first side thereof and a functional interdigitated flow field 20i on the opposite side thereof. More specifically, the bipolar plate 12 is formed so as to provide a reactant gas flow field characterized by a plurality of lands 54s, 54i that define a plurality of flow channels 56s, 56i through which the reactant gases flow from an inlet plate margin 58 of the bipolar plate 12 to an exhaust plate margin 60 thereof. The direction of flow across bipolar plate 12 is generally from the inlet plate margin 58 through flow field 20 to the outlet plate margin 60. A plurality of supply header apertures 62 are formed near the outer edge of inlet plate margin 58. A plurality of inlet ports 64 are formed in the inlet plate margin 58 between the supply header apertures 62 and the flow field 20. Similarly, a plurality of exhaust header apertures 66 are formed near the outer edge of outlet plate margin 60 and a plurality of exhaust ports 68 are formed in the outlet plate margin 60 between the exhaust header aperture 66 and flow field 20. While header apertures 62 and 66 and ports 64 and 68 have been generally described, one skilled in the art will readily recognize that each such aperture and port are dedicated to communicating a specific fluid such as the fuel or the oxidant or the coolant, through the fuel stack. When the fuel cell is fully assembled, the lands 54s, 54i press against the primary current collectors 38 and 40 which, in turn, press against the MEA 10. In operation, current generated by the MEA flows from the primary current collectors 38 and 40 through the lands 54s, 54i and thence through the fuel cell stack. The reactant gases are supplied to flow channels 56s, 56i from supply header aperture 62 via inlet port 64 through the channels 56 and exits exhaust header aperture 66 via exhaust port 68.

Figures 3, 5:
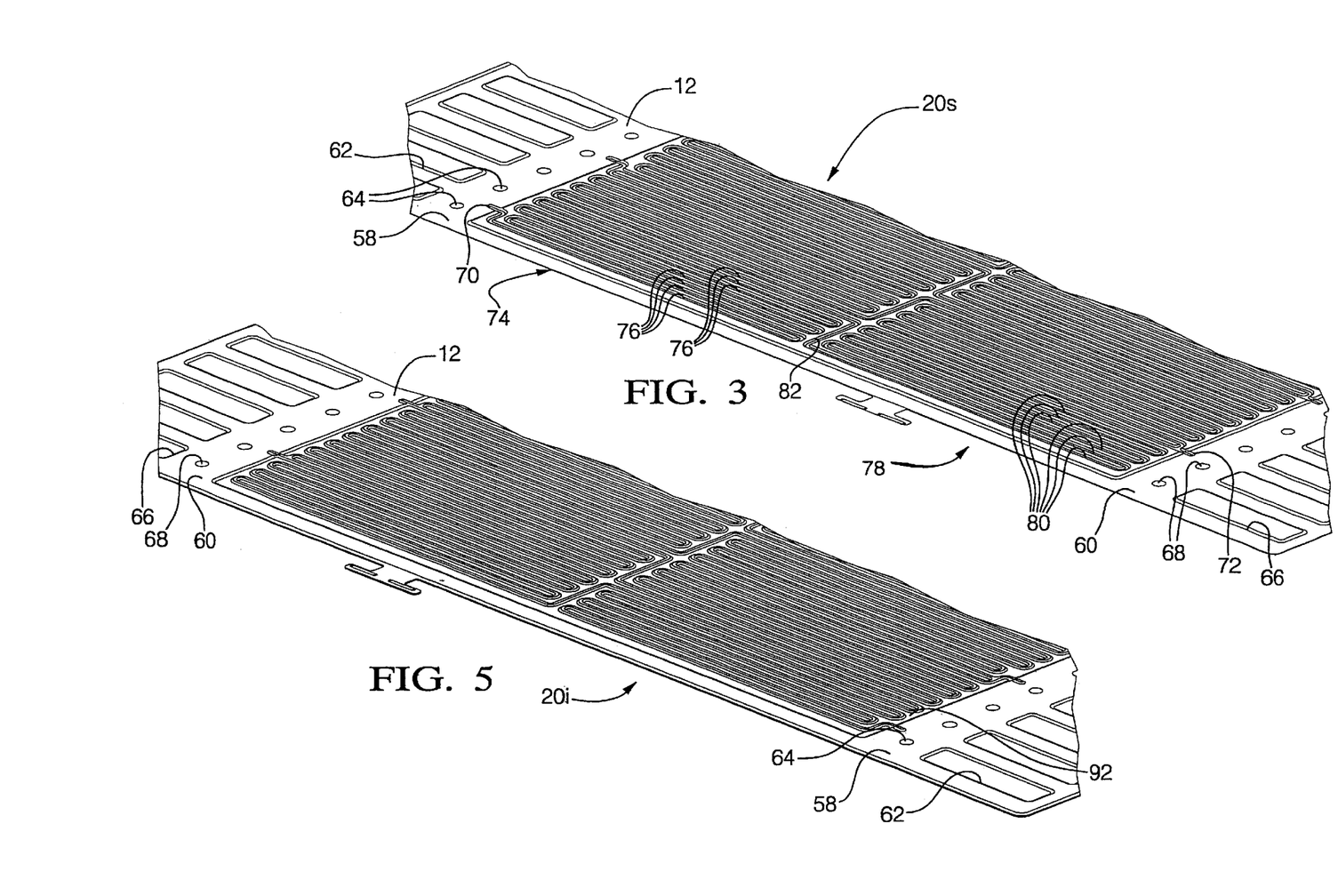
FIG. 3 is an isometric view of a portion of the top surface of the bipolar plate illustrated in FIG. 2 having a serpentine flow field formed thereon.
FIG. 5 is an isometric view of a portion of the bottom surface of the bipolar plate illustrated in FIG. 2 having an interdigitated flow field formed thereon.
Figure 4:
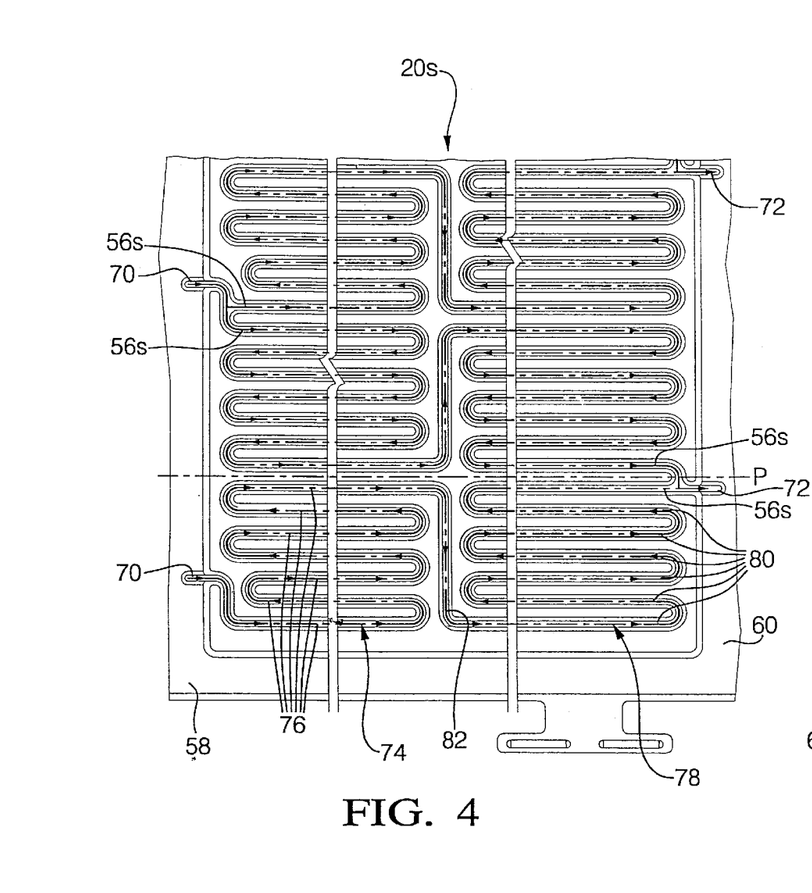
FIG. 4 is a plan view of the top of the bipolar plate illustrated in FIG. 2.
Figure 7:
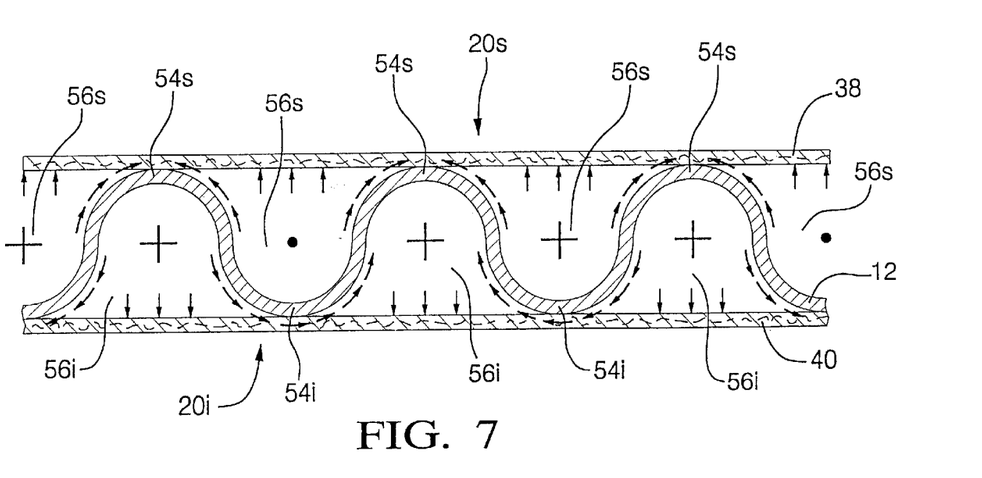
FIG. 7 is a cross section of a bipolar plate and porous primary current collectors in a fuel cell stack illustrating the direction of reactant gas flow.

With reference now to FIGS. 3, 4 and 7, the serpentine flow field 20s will be described in further detail. Serpentine flow field 20s includes an inlet feed 70 providing fluid communication into flow channel 56s which traverses the width of the bipolar plate 12 and terminates at exhaust feed 72. Flow channel 56s is defined by a first serpentine path 74 having plurality of medial legs 76 extending transversely on the bipolar plate 12 and a second serpentine path 78 having a plurality of medial legs 80 extending transversely on the bipolar plate 12. First and second serpentine paths 74, 78 each traverse approximately one-half the width of the bipolar plate 12 and are fluidly coupled by a crossover leg 82. As best seen in FIG. 4, the adjacent interior serpentine flow channels 56s are supplied by a common inlet feed 70 and share a common exhaust feed 72. Hence, the inlet legs of the adjacent flow channels are contiguous to each other at the inlet feed 70, and the outlet legs of the adjacent flow channels are contiguous to each other at the exhaust feed 72. Effectively, each flow channel is a mirror image of the next adjacent flow channel. Reactant gases flowing in serpentine flow channels 56s may also flow through the primary current collector 38 to an adjacent flow channel 56s as illustrated in FIG. 7.

Figure 6:
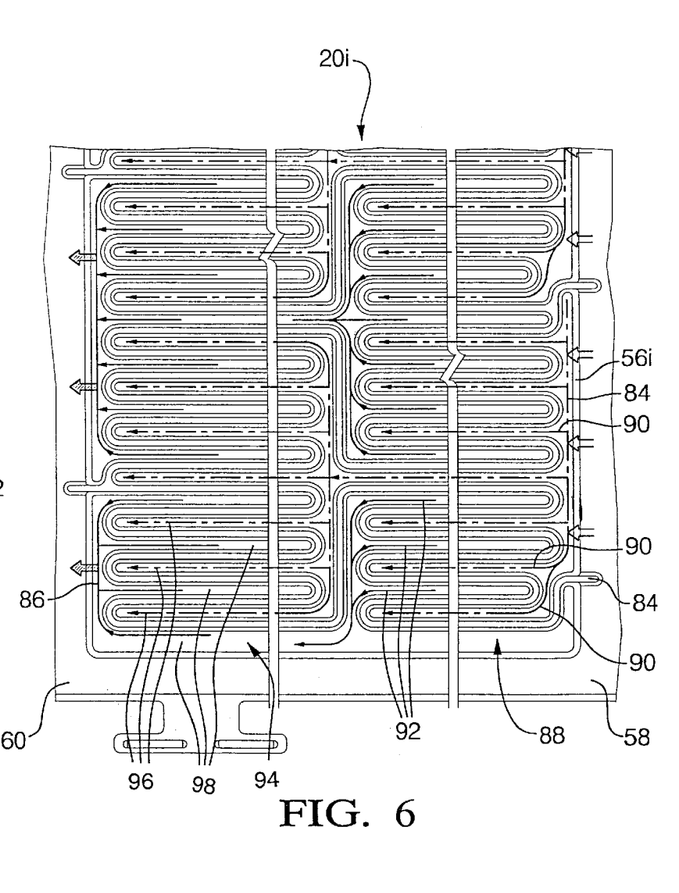
FIG. 6 is a plan view of the bottom of the bipolar plate illustrated in FIG. 2.

With reference now to FIGS. 5–7, the interdigitated flow field 20i will now be described. Flow channels 56s formed on the serpentine side 20s of the bipolar plate 12 define lands 54i on the opposite side, and likewise lands 54s on the serpentine side 20s of bipolar plate 12 define flow channels 56i on the opposite side thereof. As best seen in FIG. 6, interdigitated flow field 20i includes an inlet feed 84 providing fluid communication into flow channel flow 56i which traverses the width of bipolar plate 12 and terminates at exhaust feed 86. As with the serpentine flow channels 56s, the interdigitated flow channels 56i are divided into a first interdigitated flow path 88 having a plurality of medial legs 90 in fluid communication with the inlet feed 84 and a plurality of medial legs 92 in fluid communication with exhaust feed 86 which traverse the first half of the bipolar plate and a second interdigitated flow path 94 having a plurality of medial legs 96 in fluid communication with the inlet feed 84 and a plurality of medial legs 98 in fluid communication with exhaust feed 86 which traverse the second half of the bipolar plate 12. Reactant gas flowing in the interdigitated flow paths 88, 94 from inlet feed 84 must cross over land 54i through the primary current collector 40 to be discharged through exhaust feed 86, as best seen in FIG. 7.

Figure 8:
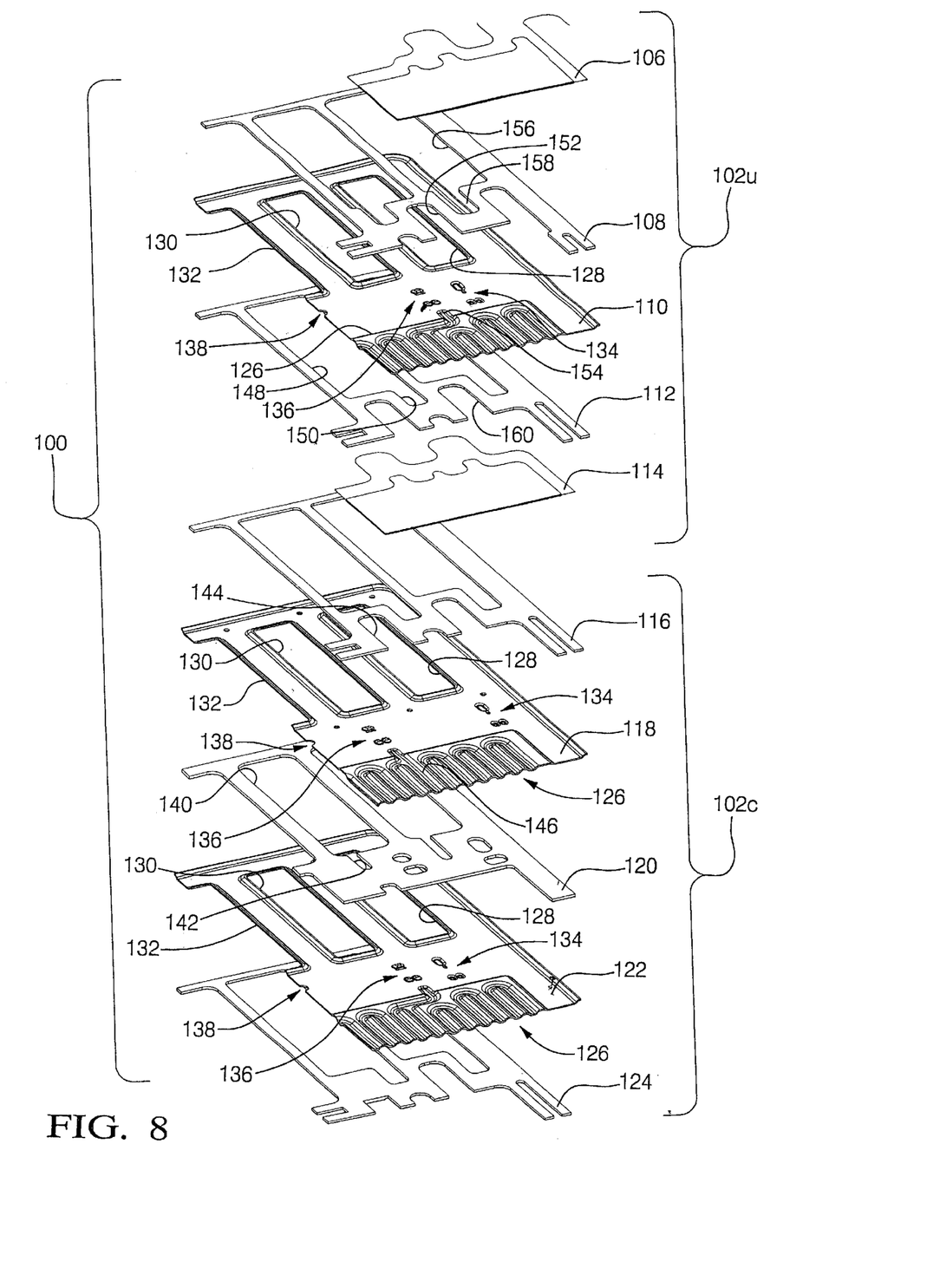
FIG. 8 is an isometric exploded view of a pair of fuel cells including an uncooled cell and a cooled cell in a fuel stack.
Figure 9:
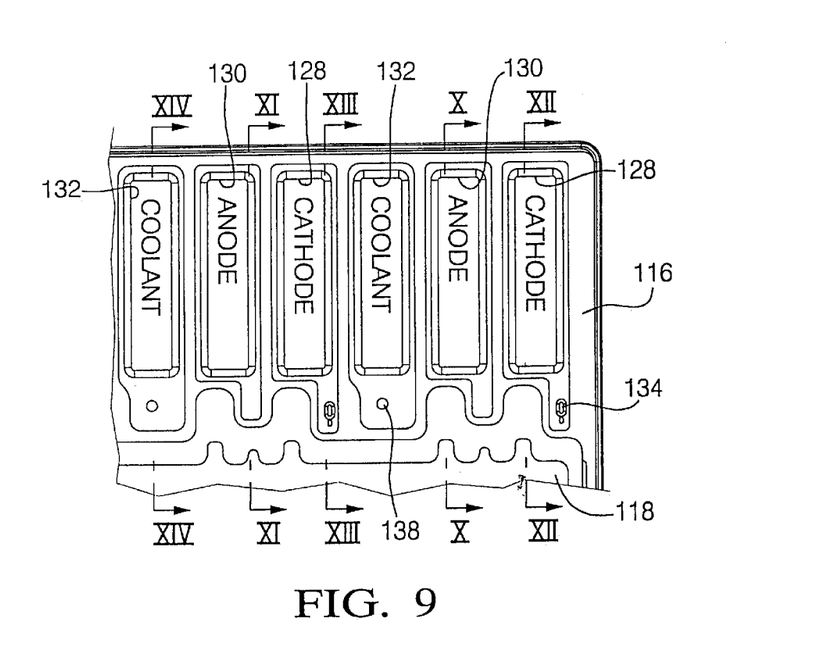
FIG. 9 is a plan view of the fuel cell stack illustrated in FIG. 8.

Referring now to FIG. 8, a partial isometric exploded view of a PEM fuel stack 100 having an uncooled fuel cell 102u and a cooled fuel cell 102c is illustrated. Uncooled fuel cell 102u includes MEA/primary current collector assembly 106, seal 108, bipolar plate 110, and seal 112 arranged in a stacked relationship. The cooled fuel cell 102c includes MEA/current conductor assembly 114, seal 116, bipolar plate 118, spacer 120, bipolar plate 122 and seal 124. One skilled in the art will readily recognize that while PEM fuel stack 100 is shown having one uncooled fuel cell 102u and one cooled fuel cell 102c, the ratio of cells with cooling to cells without cooling in the stack is variable depending on the operating characteristic of the stack. As such any ratio (e.g., ½, ⅓, ¼, . . . ) is contemplated by the present invention. In addition, an air cooled stack (i.e. having a ratio of ø) which uses the reactant air for cooling is also contemplated by the present invention.

Bipolar plates 110, 118 and 122 have a flow field 126 defining serpentine flow channels formed on the upper surface thereof and interdigitated flow channels formed on the lower surface thereof as heretofore described. A series of rectangular supply header apertures 128 (oxidant), 130 (fuel) and 132 (coolant) are formed through the bipolar plates 110, 118 and 120 for communicating the gaseous reactants (i.e., the oxidant and the fuel) and coolant, respectively from the plumbing 42 (oxidant), 44 (fuel) and 50 (coolant) through the fuel stack. In this regard, the bipolar plates 110, 118 and 122 are arranged in a stacked relationship such that the apertures 128, 130 and 132 align to form fluid feed tunnels axially through the fuel stack. Bipolar plates 110, 118 and 122 also have ports 134, 136 and 138 formed therein for directing gaseous reactants and coolant respectively from the supply header apertures 128, 130 and 132 to the appropriate flow field 126.

The present invention utilizes a staggered seal arrangement which form fluid communication paths from the header apertures through the ports to the flow fields. Specifically, the configuration of seals 108, 112, 116 and 124 as well as spacer 120 define such fluid communication paths depending upon the fluid flowing therethrough.

With reference now to FIGS. 8 through 14, the staggered seal configuration of the present invention will be described in further detail. In the case of the fuel flow through the cooled cell 102c, a reactant fuel gas, is communicated from supply header aperture 130 below bipolar plate 118 through anode port 136 above bipolar plate 118 to the anode side of MEA 114 through a stepped seal configuration. More specifically, spacer 120 has an aperture 140 formed therein which includes a fluid communication path 142 circumscribing anode port 136 formed in bipolar plate 118. Seal 116 located on the opposite side of bipolar plate 118 from spacer 120 includes a fluid communication path 144 which also circumscribes anode port 136 formed in bipolar plate 118 and terminates at inlet leg 146. A similar fluid communication path is established for uncooled fuel cell 102u in that aperture 148 formed in seal 112 has a fluid communication path 150 extending therefrom such that the seal 112 circumscribes anode port 136 formed in bipolar plate 110. Seal 108 located on the opposite side of bipolar plate 110 has a fluid communication path 152 extending from an inner periphery thereof to circumscribe anode port 136 formed in bipolar plate 110 and terminates at inlet leg 154.

Figure 10:
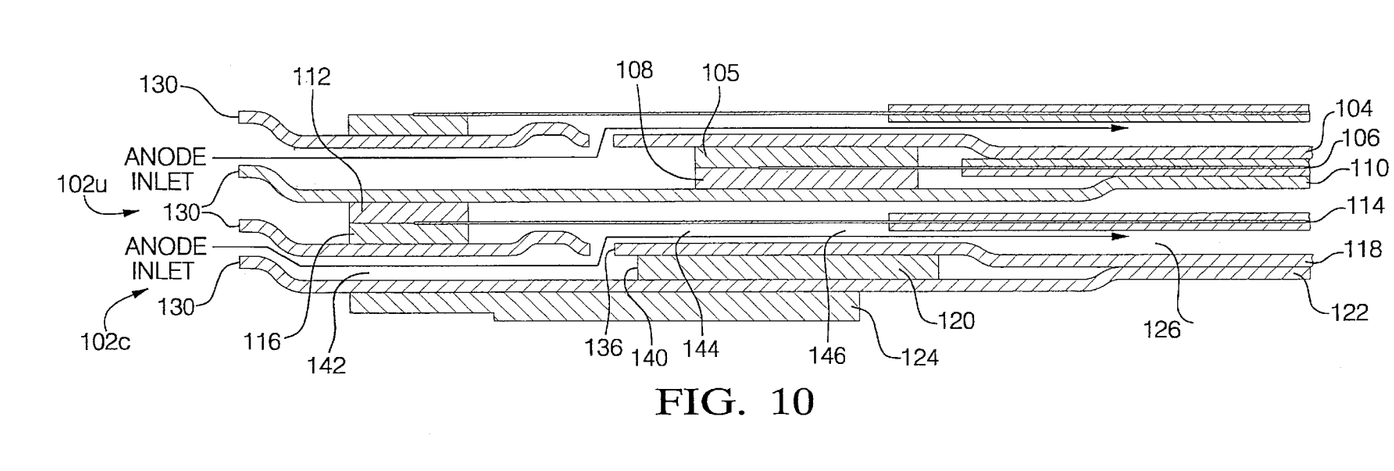
FIG. 10 is a cross section taken along line X—X of FIG. 9 showing the anode porting.
Figure 11:
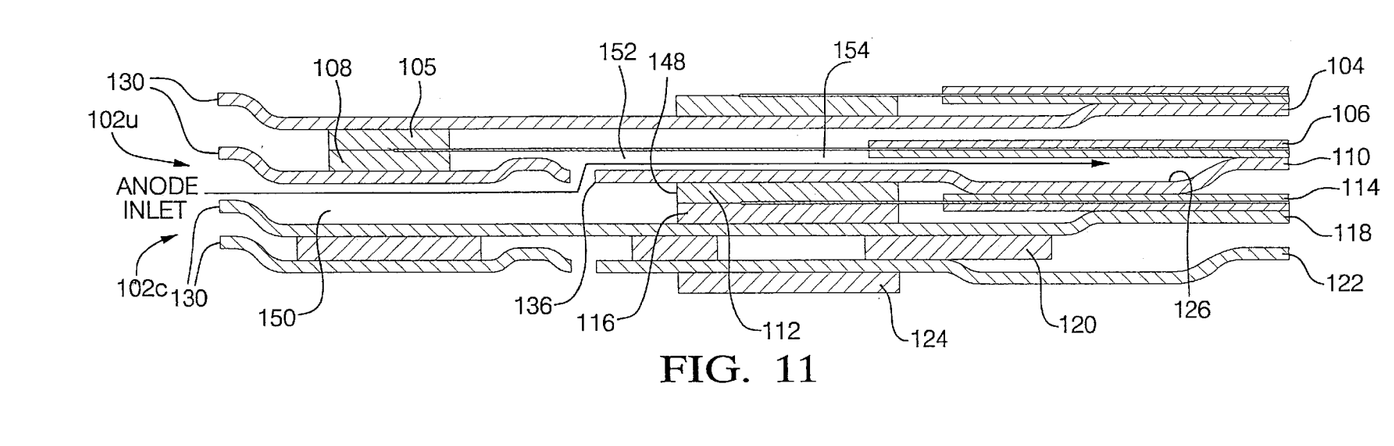
FIG. 11 is a cross section taken along line XI—XI of FIG. 9 showing the anode porting.

With particular reference now to FIG. 10, the anode fluid flow path to MEA 114 is illustrated. Fuel flows through supply header aperture 130 along fluid communication path 142 defined by bipolar plate 118, spacer 120 and bipolar plate 122 through anode port 136 and along fluid communication path 144 defined by MEA 114, seal 116 and bipolar plate 118. Similarly, with reference to FIG. 11, the anode fluid flow path to MEA 106 is illustrated. Fuel flows through supply header aperture 136 along fluid communication path 150 defined by bipolar plate 110, seals 112, 116 and bipolar plate 118 through anode port 136 formed in bipolar plate 110 and then along fluid communication path 152 defined by MEA 106, seal 108 and bipolar plate 110. In each of these instances, the anode fluid flow path directs fuel from the fuel supply to the anode face of MEA 106 and 114.

Figure 12:
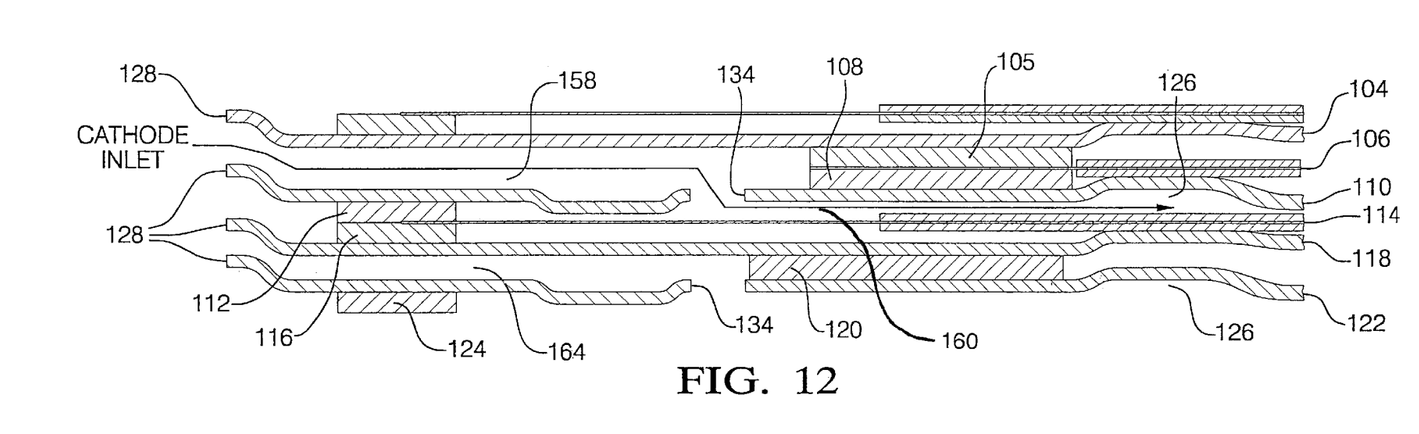
FIG. 12 is a cross section taken along line XII—XII of FIG. 9 showing the cathode porting.
Figure 13:
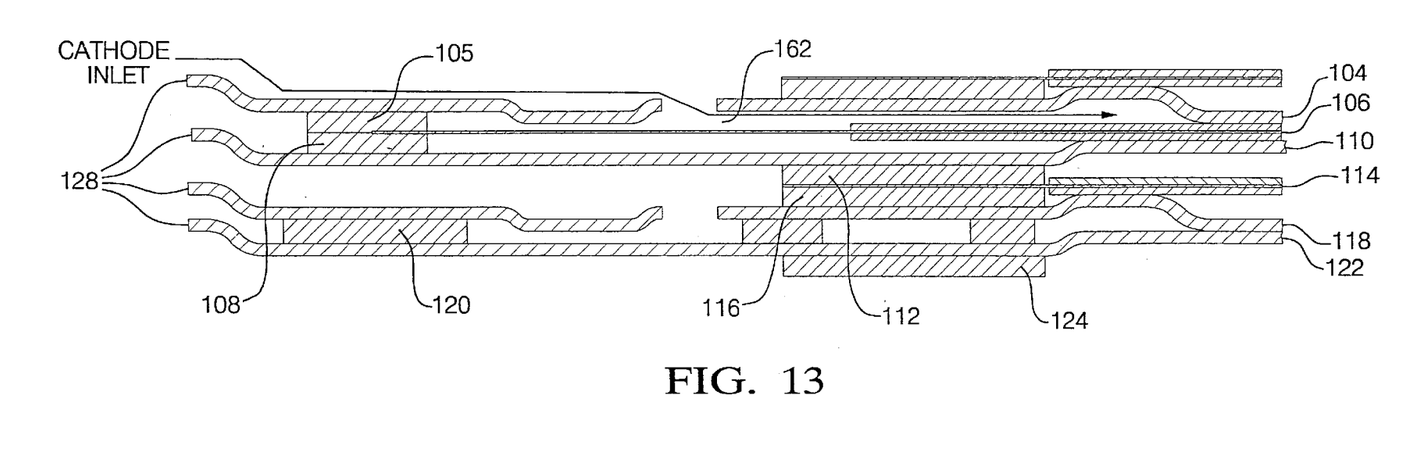
FIG. 13 is a cross section taken along line XIII—XIII of FIG. 9 showing the cathode porting.

In the case of oxidant flow through the cooled cell 102c, a reactant oxidant gas is communicated from supply header aperture 128 above bipolar plate 110 through cathode port 134 below bipolar plate 110 to the cathode side of MEA 114 through a stepped sealed configuration. More specifically, seals 105, 108 have an aperture 156 formed therein which includes a fluid communication path 158 circumscribing cathode port 134 formed in bipolar plate 110. Seal 112 located on the opposite side of bipolar plate 110 from seal 108 includes a fluid communication path 160 which also circumscribes cathode port 134 formed in bipolar plate 110 and terminates at inlet leg 154. A similar fluid communication path is established for cooled fuel cell 102c is defined by the staggered seal configuration.

With particular reference now to FIG. 12, the cathode fluid flow path to MEA 114 is illustrated. Oxidant flows through supply header aperture 128 along fluid communication path 158 defined by bipolar plate 104, seals 105, 108 and bipolar plate 110 through cathode port 134 and then along fluid communication path 160 defined by bipolar plate 110, seal 112 and MEA 114. Similarly, with reference to FIG. 13, oxidant flows through supply header aperture 128 above bipolar plate 104 through cathode port 134 and then along fluid communication path 162 defined by bipolar plate 104, seal 105 and MEA 106.

Figure 14:
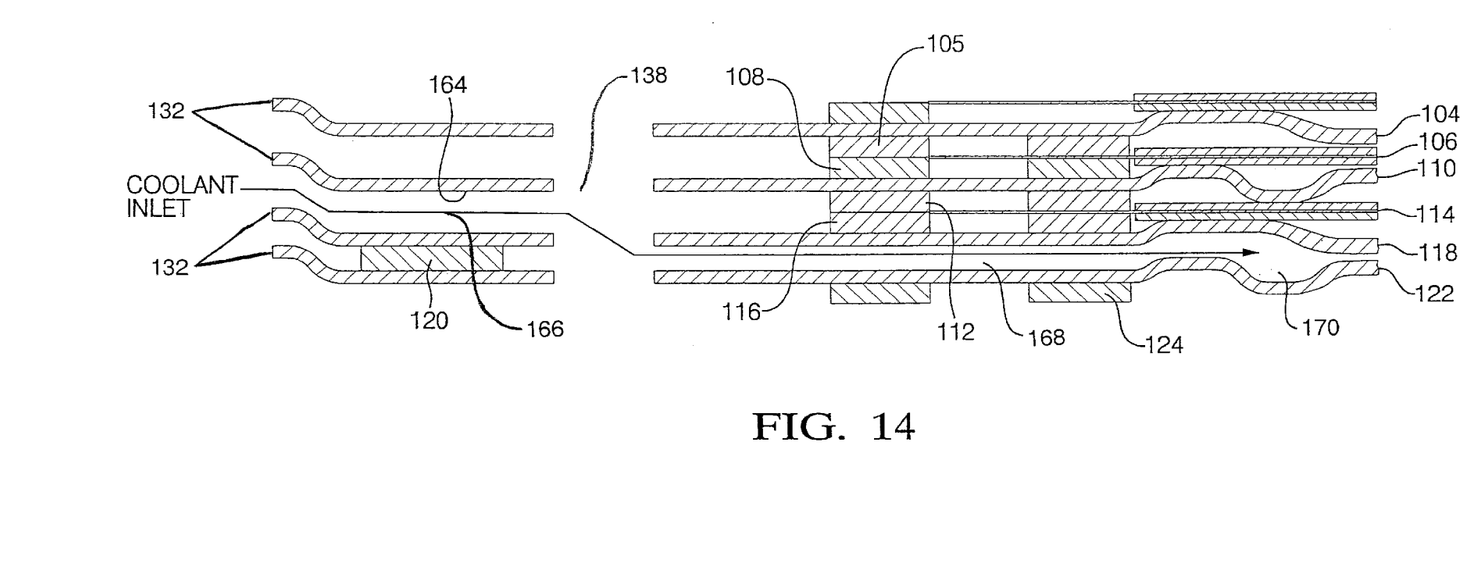
FIG. 14 is a cross section taken along line XIV—XIV showing the coolant porting.

With reference now to FIG. 14, the cooled fuel cell 102c flow path is illustrated. A coolant is communicated from supply header aperture 132 between bipolar plates 110 and 118, through coolant port 138, below bipolar plate 118 through a stepped sealed configuration. More specifically, seals 112, 116 have an aperture 164 formed therein which includes a fluid communication path 166 circumscribing coolant port 138 formed in bipolar plate 118. Spacer 120 located on the opposite side of bipolar plate 118 includes a fluid communication path 168 which also circumscribes coolant port 138 formed in bipolar plate 118 and terminates at an interior coolant volume 170.

Coolant flows through supply header aperture 132 along fluid communication path 166 defined by bipolar plate 110, seals 112, 116 and bipolar plate 118 through coolant port 138 and then along fluid communication path 168 defined by bipolar plate 118, spacer 120 and bipolar plate 122 into an interior coolant volume 170 defined between the flow fields formed on the bipolar plate 118 and bipolar plate 122.

The supply or inlet flow of fluid into the fuel stack 100 has been described above in particular detail. One skilled in the art will readily recognize that the staggered seal configuration of the present invention incorporates a similar staggered seal configuration on the exhaust side of the fuel stack 100 for exhausting the gaseous reactants and coolant from the fuel stack. Thus, through the use of the stepped sealed arrangement described above, the present invention is able to efficiently transport the gaseous reactants and coolant into, through and out of the fuel stack 100.

While the present invention has been described through the use of a seal disposed on either side of the MEAs (i.e. a pair of seals), one skilled in the art would readily recognize that a single seal could be substituted in this arrangement without deviating from the spirit and scope of the present invention. Furthermore, while the present invention has been described as using the serpentine flow field for the anode side of the fuel cell and the interdigitated flow field for the cathode side of the fuel cell, one skilled in the art would readily recognize that the interdigitated flow field may have certain utility for use on the anode side of the fuel cell, and likewise the serpentine flow field may have certain utility for use on the cathode side of the fuel cell as determined by the particular application. Thus, while the invention has been disclosed in terms of various preferred embodiments, it is not intended that the present invention be limited thereto but rather only to the extent set forth hereafter in the claims which follow.

What is claimed is:

1. A bipolar plate assembly for a PEM fuel cell comprising:

a bipolar plate having a plurality of lands formed therein to define a serpentine flow field on a first side of said bipolar plate and an interdigitated flow field on a second side of said bipolar plate, a plate margin having a first header aperture formed therethrough, a first port formed therethrough between said first header aperture and said serpentine flow field, a second header aperture formed therethrough, and a second port formed therethrough between said second header aperture and said interdigitated flow field;

a first seal disposed on said second side of said bipolar plate and having a first passageway formed therein to define a first fluid communication path between said first header and said first port and a second passageway formed therein to define a second fluid communication path between said second port and said interdigitated flow field; and a second seal disposed on said first side of said bipolar plate and having a third passageway formed therein to define a third fluid communication path from said second header to said second port and a fourth passageway formed therein to define a fourth fluid communication path from said first port to said serpentine flow field.

2. The bipolar plate assembly of claim 1 wherein said first passageway of said first seal circumscribes said first header aperture and said first port and said third passageway of said second seal circumscribes said second header aperture and said second port.

3. The bipolar plate assembly of claim 2 wherein said first seal provides a fluid tight seal between said first passageway and said interdigitated flow field, and said second seal provides a fluid tight seal between said second header and said fourth passageway.

4. The bipolar plate assembly of claim 1 wherein said bipolar plate further comprises a plurality of generally parallel serpentine flow channels formed on said first side of said bipolar plate, and a plurality of generally parallel interdigitated flow channels formed on said second side of said bipolar plate.

5. The bipolar plate assembly of claim 4 wherein said bipolar plate has a serpentine inlet passageway formed therein for providing fluid communication between said fourth passageway and a pair of adjacent serpentine flow channels.

6. The bipolar plate assembly of claim 1 wherein said serpentine flow field further comprises a plurality of first medial legs defining a first serpentine flow path and a plurality of second medial legs defining a second serpentine flow path, said first and second serpentine flow paths arranged in an end-to-end configuration with respect to a flow direction and fluidly coupled through a first crossover leg.

7. The bipolar plate assembly of claim 6 wherein said serpentine flow field further comprises a plurality of third medial legs defining a third serpentine flow path adjacent to said first serpentine flow path and a plurality of fourth medial legs defining a fourth serpentine flow path adjacent to said second serpentine flow path, said third and fourth serpentine flow paths arranged in an end to end configuration with respect to said flow direction and fluidly coupled through a second crossover leg.

8. The bipolar plate assembly of claim 7 wherein said bipolar plate has a serpentine inlet leg passageway formed therein for providing fluid communication between said fourth passageway and said first and third serpentine flow paths.

9. A PEM fuel cell comprising:

a bipolar plate having a plurality of lands formed therein to define a serpentine flow field on a first side of said bipolar plate and an interdigitated flow field on a second side of said bipolar plate, a plate margin having a first header aperture formed therethrough, a first port formed therethrough between said first header aperture and said serpentine flow field, a second header aperture formed therethrough, and a second port formed therethrough between said second header aperture and said interdigitated flow field;

a first seal disposed on said second side of said bipolar plate and having a first passageway formed therein to define a first fluid communication path between said first header aperture and said first port and a second passageway formed therein to define a second fluid communication path between said second port and said interdigitated flow field;

a second seal disposed on said first side of said bipolar plate and having a third passageway formed therein to define a third fluid communication path from said second header aperture to said second port and a fourth passageway formed therein to define a fourth fluid communication path from said first port to said serpentine flow field;

a first membrane electrode assembly including a first proton exchange membrane having a first face and a second face opposite said first face, a first current collector engaging said first face, said first membrane electrode assembly being supported on said second seal such that said first current collector is in contact with said serpentine flow field; and a second membrane electrode assembly including a second proton exchange membrane having a first face and a second face opposite said first face, a second current collector supported on said first face, said first face of said second membrane electrode assembly engaging said first seal such that said second current collector is in contact with said interdigitated flow field.

10. The PEM fuel cell of claim 9 wherein said first passageway of said first seal circumscribes said first header aperture and said first port and said third passageway of said second seal circumscribes said second header aperture and said second port.

11. The PEM fuel cell of claim 10 wherein said first seal provides a fluid tight seal between said first passageway and said interdigitated flow field, and said second seal provides a fluid tight seal between said second header and said fourth passageway.

12. The PEM fuel cell of claim 9 wherein said bipolar plate further comprises a plurality of generally parallel serpentine flow channels formed on said first side of said bipolar plate, and a plurality of generally parallel interdigitated flow channels formed on said second side of said bipolar plate.

13. The PEM fuel cell of claim 12 wherein said bipolar plate has a serpentine inlet leg formed therein for providing fluid communication between said fourth passageway and a pair of adjacent serpentine flow channels.

14. The PEM fuel cell of claim 9 wherein said serpentine flow field further comprises a plurality of first medial legs defining a first serpentine flow path and a plurality of second medial legs defining a second serpentine flow path, said first and second serpentine flow paths arranged in an end-to-end configuration with respect to a flow direction and fluidly coupled through a first crossover leg.

15. The PEM fuel cell of claim 14 wherein said serpentine flow field further comprises a plurality of third medial legs defining a third serpentine flow path adjacent to said first serpentine flow path and a plurality of fourth medial legs defining a fourth serpentine flow path adjacent to said second serpentine flow path, said third and fourth serpentine flow paths arranged in an end-to-end configuration with respect to said flow direction and fluidly coupled through a second crossover leg.

16. The PEM fuel cell of claim 15 wherein said bipolar plate has a serpentine inlet leg formed therein for providing fluid communication between said fourth passageway and said first and third serpentine flow paths.

17. The PEM fuel cell of claim 9 wherein said first face of said first membrane electrode assembly is an anode face and wherein said second face of said second membrane electrode assembly is a cathode face.

18. A PEM fuel cell comprising:

a first bipolar plate assembly including:
 a first plate member having a plurality of lands formed therein to define a first serpentine flow field on a top side of said first plate member and a first interdigitated flow field on a bottom side of said first plate member, a plate margin having a first header aperture formed therethrough, a first port formed therethrough between said first header aperture and said first serpentine flow field, a second header aperture formed therethrough, and a second port formed therethrough between said second header aperture and said first interdigitated flow field;

a first seal disposed on said bottom side of said first plate member and having a first passageway formed therein to define a first fluid communication path between said first header aperture and said first port and a second passageway formed therein to define a second fluid communication path between said second port and said first interdigitated flow field; and a second seal disposed on said top side of said first plate member and having a third passageway formed therein to define a third fluid communication path from said second header to said second port and a fourth passageway formed therein to define a fourth fluid communication path from said first port to said first serpentine flow field;

a second bipolar plate assembly including:
 a second plate member having a plurality of lands formed therein to define a second serpentine flow field on a top side of said second plate member and a second interdigitated flow field on a bottom side of said second plate member, a second plate margin having a third header aperture formed therethrough, a third port formed therethrough between said third header aperture and said second serpentine flow field, a fourth header aperture formed therethrough, and a fourth port formed therethrough between said fourth header aperture and said second interdigitated flow field;

a third seal disposed on said bottom side of said second plate member and having a fifth passageway formed therein to define a fifth fluid communication path between said third header aperture and said third port and a sixth passageway formed therein to define a sixth fluid communication path between said fourth port and said second interdigitated flow field; and a fourth seal disposed on said top side of said second plate member and having a seventh passageway formed therein to define a seventh fluid communication path from said fourth header to said fourth port and a eighth passageway formed therein to define an eighth fluid communication path from said third port to said second serpentine flow field; and a membrane electrode assembly including a proton exchange membrane having a first face and a second face opposite said first face, a first current collector engaging said first face, a second current collector engaging said second face, said membrane electrode assembly being supported between said first seal and said fourth seal such that said first current collector is in contact with said first interdigitated flow field and said second current collector is in contact with said second serpentine flow field.

19. The PEM fuel cell of claim 18 wherein said first face of such proton exchange member is a cathode face and such second face of said proton exchange member is an anode face.

20. The PEM fuel cell of claim 18 further comprising a third plate member and a spacer interdisposed between said bottom side of said second plate member and said top side of said third plate member to define a coolant passageway, said third plate member including a third plate margin having a coolant header formed therethrough and in fluid communication with said coolant passageway.

* * * * *